United States Patent

Hathaway

[15] 3,697,679

[45] Oct. 10, 1972

[54] AUTOMATIC THREADING VIDEO RECORDER

[72] Inventor: Richard Allen Hathaway, Saratoga, Calif.

[73] Assignee: Ampex Corporation, Redwood City, Calif.

[22] Filed: July 1, 1970

[21] Appl. No.: 51,447

[52] U.S. Cl. ..........178/6.6 A, 179/100.2 Z, 242/192

[51] Int. Cl. ........G03b 1/58, G11b 15/66, H04n 5/78

[58] Field of Search .............178/6.6 A; 179/100.2 Z; 242/192, 195

[56] References Cited

UNITED STATES PATENTS

| | | | |
|---|---|---|---|
| 3,312,407 | 4/1967 | Goldberg | 242/195 |
| 3,160,704 | 12/1964 | Hollingsworth | 178/6.6 A |
| 3,208,682 | 9/1965 | Pastor | 242/195 |
| 3,190,575 | 6/1965 | Hayner | 242/195 |
| 3,550,983 | 12/1970 | Probst | 179/100.2 Z |

*Primary Examiner*—Howard W. Britton
*Attorney*—Fitch, Even, Tabin & Luedeka and Robert G. Clay

[57] ABSTRACT

A video tape is automatically threaded from a supply means such as a tape cartridge or cassette about a video scanner and past appropriate sound, control track and erase heads to a take up means. Preferably, a stripping means is effective to strip a leader from a tape cartridge having coiled video tape therein and feed the leader to the take up means. The video tape attached to the leader is preferably threaded at operational speed and with operational tension by a tape capstan and pressure roller means which is automatically disabled when the video tape is threaded.

13 Claims, 6 Drawing Figures

INVENTOR
Richard Allen Hathaway

Anderson, Luedeka, Fitch, Even & Tabin
ATTYS.

INVENTOR
Richard Allen Hathaway

Anderson, Luedeka, Fitch, Even & Tabin
ATTYS.

INVENTOR
Richard Allen Hathaway

Anderson, Luedeka, Fitch, Even & Tabin ATTYS

AUTOMATIC THREADING VIDEO RECORDER

This invention relates generally to machines such as video tape recorders for recording on or playing back from a video tape contained in a roll in a cartridge and more particularly to an apparatus in a video tape recorder for threading the video tape from the cartridge through instrumentalities and to a takeup reel in the video recorder.

The usual manner of threading a video tape recorder is to pull a length of tape from a roll of tape on a supply reel and manually thread the leading tape end about a scanner assembly which requires forming an arcuate loop in the video tape, and then threading the tape through a capstan tape drive and through suitable audio and erase heads before attaching the leading end of the tape to the take-up reel. This manual operation necessitates that the user understand the proper thread path for the tape; and moreover, requires a considerable handling and manipulation of the tape and access to the interior of the recorder which is best kept covered and protected from dust, damage or dirt. Such considerations are particularly pertinent to video tape recorders for home use where relatively unskilled users may improperly thread the tape or permit damage to the internal components of the tape recorder. Thus, it is desirable to provide an automatic and self-threading capability for a video tape recorder to assure easy and proper tape threading. However, the self-threading apparatus is difficult to achieve while still retaining a standard layout of video tape recorder components such as the scanner assembly, tape-driving assembly capstan, sound and video head assemblies and proper tension in the video tape. Additionally, the tape recorder should thread a standard size of video tape and also operate at the conventional speed.

Accordingly, an object of the invention is to provide an automatic self-threading capability for a video tape machine of the foregoing kind.

Other objects and advantages of the invention will become apparent from the following detailed description taken in connection with the accompanying drawings, in which.

Figure 1:
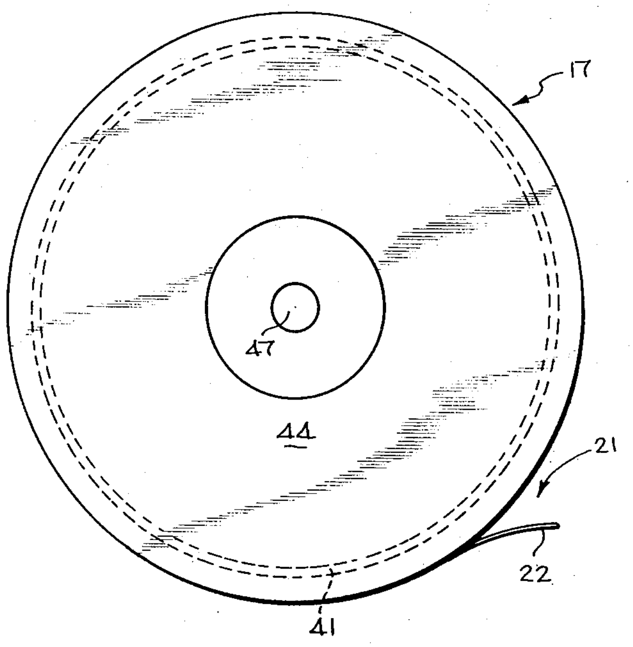
FIG. 1 is a top view of a video tape cartridge.
Figure 2:
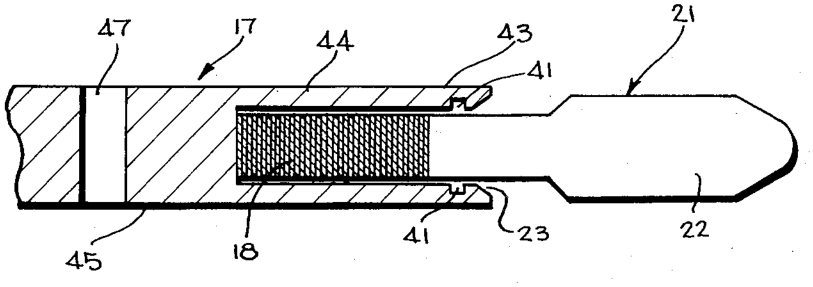
FIG. 2 is a fragmentary, partially sectioned view of a tape leader and means to secure it to the cartridge.

As shown in the drawings for the purpose of illustration, the invention is embodied in a video tape recorder 11, which has a tape supply station 13 at which is located a supply reel drive means which accepts and supports a self-contained tape cartridge 17 within which is a coil 18 of video tape 19. Attached and disposed about to the outer coil of the video tape is a tape leader 21 which is of a stiffer material than the tape. A leading end or portion 22 of the tape leader is supported by the tape cartridge and projects from a slot 23 in the cartridge for facilitating an automatic start of threading.

In accordance with the present invention, the tape leader 21 is automatically pulled from the cartridge 17 and fed forwardly for threading along a path of travel through a standard arrangement of video tape recorder components, including a video erase head 27, a scanner assembly 29, a combined audio, audio erase and control track head means 31 and a capstan tape drive means 33 to a take-up supply station 35 at which is located a tape take-up reel 37. As will be explained, the tape leader is fed forwardly to thread the tape by a threading drive means 38 (FIG. 4) into the capstan tape drive means 33, which then may control the speed and feed of the tape as it is threaded to assure that the tape is fed at the desired speed and with the desired tension in the tape. Preferably, the threading tape drive means 38 is automatically disabled when the capstan drive means 33 is enabled so that tape is driven at operational speed for winding on the take-up reel.

Referring now in greater detail to the individual elements, the illustrated tape cartridge 17 is provided with means to retain the leading end 22 of the tape leader 21 to the cartridge 17 so that the same will not fall or uncoil from the cartridge as the same is handled, shaken, vibrated or otherwise manipulated prior to or after use with the video tape recorder 11. The preferred manner of retaining the leader at the tape cartridge is to enlarge the leading end to a width dimension, which is wider than the usual ½ inch width for the remainder of the leader and for the conventional standard video tape, and to insert the widened, leading end 22 into recesses or slots 41 formed in the outer edges 43 of upper and lower reel flanges on opposite sides of the slot 23 through which the tape may exit the cartridge. The leading end 22 is thus held against unwinding or being expelled from the cartridge when manually shaken during handling or shipping. As best seen in FIG. 1, the tip of the tape leader projects outwardly from the edges of cartridge walls 43 for peeling from the slots 41. Preferably, the supply cartridge has a center reel hub opening 47, which telescopingly receives a spindle 49 of the video tape recorder when the cartridge is placed on a turntable (not shown) at this supply station 13.

Handling of the tape and leader 21 and an initial manual threading start of the tape are avoided by automatically peeling the leading end 22 from the retaining slots 41. That is to say, there is no need for an initial manual manipulation of the leader to remove the leading end 22 from the cartridge and to insert the same into the threading drive means 38. The means for peeling the leading end 22 is in the form of a pointed finger 51 of generally triangular crosssection which is mounted on a pivot post 52 for pivoting to bring a knife like edge 53 thereon from a spaced inoperative position from the cartridge 17 and leader 21 to an operative peeling position adjacent to the outer pheripheral wall 43 of the tape cartridge to engage the leading end 22 of the leader 21. When the tape cartridge beings its initial rotation in the unwinding direction, which is a counter-clockwise direction, when viewed as in FIG. 4, the edge 53 of the peeling finger engages the under side of the leader and as the cartridge continues to turn the leader 21 moves forwardly across the upper side of the finger and to the threading drive means 38 which is closely located adjacent to the peeling finger.

Figure 3:
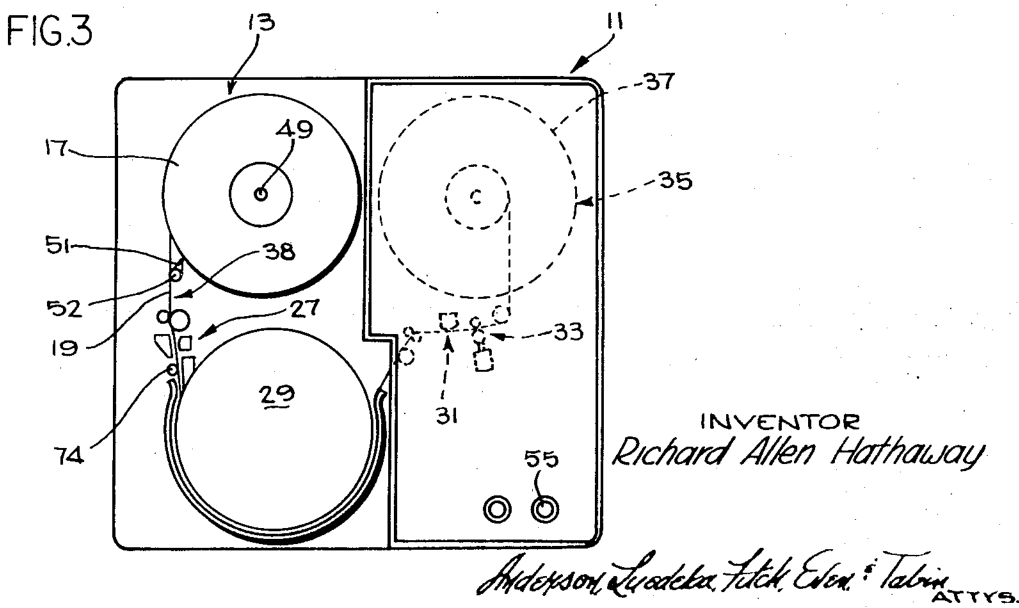
FIG. 3 is a top view of an automatic threading video tape recorder embodying the novel features of the invention.
Figure 4:
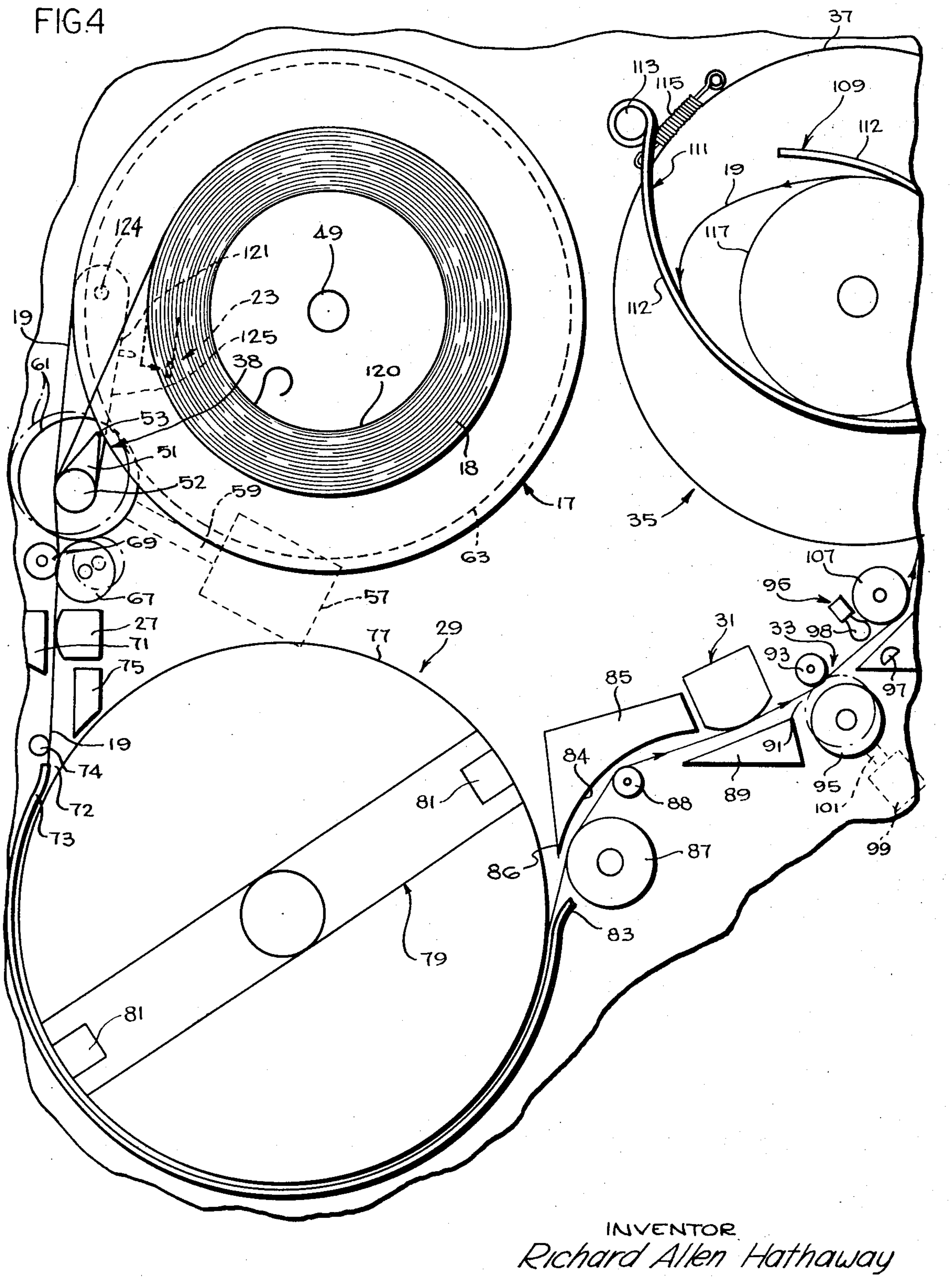
FIG. 4 is a diagrammatic, enlarged view of the self-threading mechanism for the video tape recorder of FIG. 3.

The self-threading operation may be instituted by depression of a thread push button 55 on a control panel of the video tape recorder 11, as best seen in FIG. 3, which causes the supply cartridge 17 to turn and the peeling finger 51 to pivot to a position to peel the projecting end 22 of the tape leader from the tape cartridge and start the same to move forwardly. The push button accomplishes the foregoing by completing a circuit to energize a solenoid 57, as best seen in FIG. 4, which has a plunger 59 connected to a rotatable idler 61 by a link means to move the idler into contact with an annular drive surface 63 on a turntable which supports and carries the tape cartridge 17. The idler 61 is pulled by the solenoid 57 into frictional engagement with and is driven by a push roller 67 which is connected to a motor (not shown) and supplies the driving power for turning the tape cartridge turntable. The push roller 67 is also mounted on a lever means for shifting from a position spaced from the path of travel for the leader and tape with operation of the solenoid 57 to a position in which it establishes a feeding nip with a pinch roller 69 which is disposed on the opposite side of the leader or tape. Thus, during the initial rotation of the tape cartridge, the leading end of the leader is peeled from the slot and is guided into the nip between the pusher roller 67 and the pinch roller 69, which then begin to push the leader forward.

The leader 21 is preferably of such a stiffness that it will be self supporting in comparison to the relatively limp video tape 19 to which it is attached and yet sufficiently flexible to be guided for travel along curved paths particularly about the scanner assembly 29. The preferred leader is about two feet in length in order that it may extend from the pusher roller 67 all the way to the tape capstan drive means 33 during the threading operation. This length has been found to be sufficient to extend the full tape about the video erase head 27, scanner assembly 29, and other audio, erase and track heads 31 when the latter are positioned in accordance with the conventional arrangement for video tape recorders.

The video erase head 27 is disposed immediately downstream of the push roller 67 and pinch roller 69 to receive the leading end 22 of the leader 21 as the latter exits from the nip between the push roller 67 and pinch roller 69. When leaving the push and pinch rollers, the leading end 22 is generally aligned with a slot formed between a stationary guide chute 71 and the video erase head 27, the leader exits the video erase head past fixed edge guide 74 and is aligned to insert into a gap 72 formed between a curved guide 73 and a cylindrical surface 77 of a scanner disk of the scanner assembly 29. Another guide 75 may be placed adjacent the scanner cylindrical surface and spaced up-stream from the inlet end of the curved guide 73 to assure that the leading end enters a throat between the scanner and the curved guide. Within the scanner assembly, is the conventional scanning bar 79 containing two video heads 81. Preferably, the scanner guide 73 is substantially continuous and guides through an arcuate path about the scanner surface 77 until the leader exits at an outlet end 83 of the curved guide 73.

As the leading end 22 of the leader 21 exits the outlet end 83 of the curved guide 73 for the scanner assembly 29, it abuts and slides along a concave surface 84 of a fixed guide chute 85 which has edge 86 closely adjacent the outlet end of the scanner guide 73. Closely adjacent but spaced from the fixed guide chute 85 is an exit edge guide 87 about which the tape will be guided. A vertical edge guide 88 in the form of a roller is spaced from the concave surface 84 of the fixed guide chute 85 and the leader will move through the gap therebetween. As the leading end of the leader exits the concave surface 84 of the fixed guide chute 85, it moves into a space between an audio, erase and control track head means 31, which are located in a single stanchion and a thread guide 89 which is spaced from and is disposed on the opposite side of the leader from this stanchion. The pusher roller 67 continues to push the leader 21 and its leading end 22 forwardly from this stanchion to the capstan drive means 33 and more specifically into a gap 91 between a tape feed capstan 93 and a cooperating pinch roller 95. At this time, the pinch roller 95 may be spaced from the capstan 93 by a distance greater than thickness of the tape leader so that the leading end 22 passes quickly through the gap 91 therebetween and forwardly to a sensing means 96 which detects that the leading end 22 has progressed through the capstan drive means 33. Alternatively, the pinch roller 95 and capstan 93 may be engaged before entry of the leading end of the leader. At the time that the leading end 22 of the leader is sensed by the sensing means 96, the leader 21 extends for about 2 feet through the various assemblies of the video tape recorder and back through the nip of the thread driving means at the push roller 67.

The preferred manner of assuring that the video tape is threaded through the machine at the usual operating speed and with the normal amount of tension needed for operation is to have the sensing means 96 disable the push drive initial threading means 38 and to enable the capstan drive means 33 for pulling the video tape from the tape reel and moving the same through the scanner assembly and past the respective heads of the video tape recorder. More specifically, the sensing means 96, which is in the form of a photocell 97 and a light source 98 disposed on opposite sides of the leader 21 and tape travel path, sense the leading end 22 of the leader 21 and operating relay (not shown) to open the circuit for the solenoid 57 whereby the solenoid plunger 59 is returned by a spring (not shown) to shift the link means to move the idle roller 61 to its position spaced from the turntable surface 63 (as shown in dotted lines FIG. 4). Also, the return of the solenoid plunger 59 swings the push roller 67 from the leader to a position in which it is spaced from the pinch roller 69 sufficiently that it will not feed the leader or the tape 19. The sensing means also energizes solenoid 99 to move its plunger 101 to shift the pinch roller 95 toward the tape and into operative position with the capstan 93 so that the leader is now being pulled forwardly by the capstan drive means 33 at the usual operational speed, e.g. 7½ ips.

As the leading end of the leader is fed forwardly by the tape capstan drive means 33, it passes a roller guide 107 and moves into engagement with a first, pivotally mounted arcuate guide follower 109 at the take-up reel station 35 and is guided partially about the reel hub into engagement with a second guide follower 111. The guide followers 109 and 111 are substantially identically in construction and include a curved member 112 pivotally mounted on a pivot post 113 and urged by a spring 115 against a friction surface such as rubber or vinyl on a cylindrical, peripheral surface of a hub 117 of the take up reel 37. The spring biased follower 111 holds the leading end of the leader with sufficient force against the frictional surface on the hub 117 that the leader moves therewith and wraps thereon. The take up reel hub 117 is driven at operational speed to wind the leader and to take up tape from the capstan drive means.

It is preferred that a time delay (not shown) be provided to de-energize the solenoid 99 to retract the pinch roller 95 and to disable the motor drive of take up hub 117 after a time sufficient to assure that the 2 feet of leader is wrapped on the take up reel and the video tape is in operational position. Thus, the tape transport is automatically terminated at the end of the threading operation and the unit is ready for a subsequent operation of a play or record push button operation to commence recording or playback.

In the preferred embodiment of the invention the inner end of tape 19 coiled within the tape cartridge is fastened by a length of material similar to the leader material to a central hub 120 of the supply cartridge. When the video tape 19 has been stripped and uncoiled from the cartridge, an additional pulling of the tape 19 by the tape capstan drive means 93 applies sufficient torque to a tape tension arm 121 to swing it counterclockwise as viewed in FIG. 4 to operate a switch 123 which will indicate the end of the tape. Preferably, the tape tension arm 121 is pivotally mounted on a pivot post 124 and is formed with an arm 125 on a free end of which is journaled a roller for engaging the inner side of the video tape and exerting an outward tension or pull on the tape. The stripping finger 51 may also be mounted on the tape hold back tension arm 125 if so desired.

As an alternative to the use of the time delay relay for disabling the tape capstan drive means 33 at the end of the tape threading operation, it may be desired to utilize a clear transparent plastic material for the leader 21 and to continue the feeding of the tape and leader until the opaque video tape is sensed by the photocell sensing means 96 at which time the tape capstan means 33 may be disabled. Thus, the tape will be threaded and the apparatus made ready for a subsequent play or record mode of operation when the sensing means 95 stops the tape movement.

Figures 5, 6:
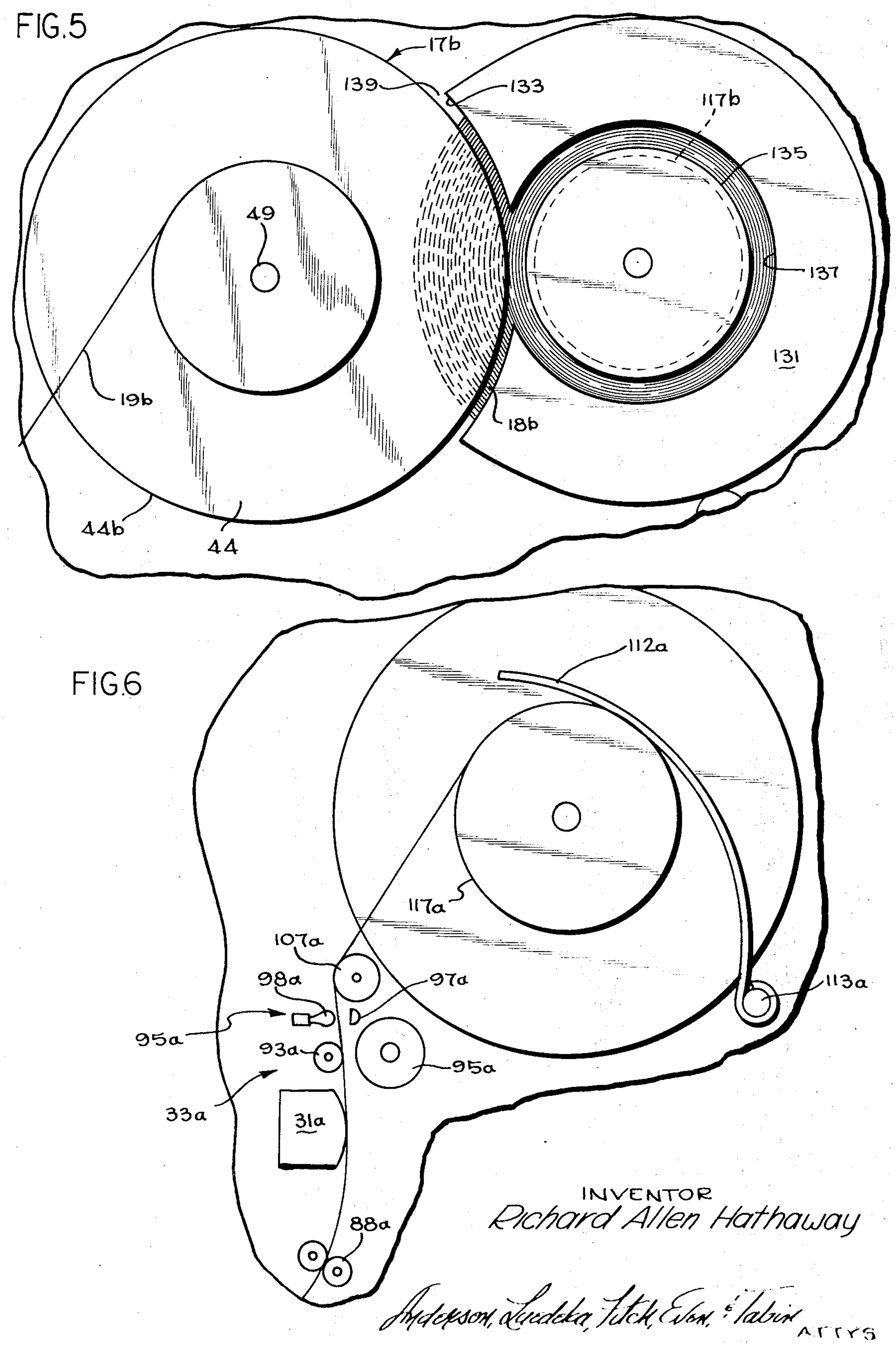
FIG. 5 illustrates winding of the video tape in a reverse direction from the winding direction of FIG. 4.
FIG. 6 illustrates another embodiment of the invention.

As will be understood by those skilled in the art, in the above described embodiment of the invention the video tape was described as being threaded and wrapped on the take-up hub 117 in a so-called "A" wrap with the oxide layer in when wound on the take up hub 117 turning a counterclock-wise direction as viewed in FIG. 4. On the other hand, the oxide layer of the video tape may be wrapped on the take up hub with the oxide layer facing out by wrapping the video tape in a clockwise direction on a take up hub in a so-called "B" wrap. When it is desired to provide a "B" wrap, the audio erase and sound head means 31*a*, capstan drive means 33*a* and sensing means 95*a* along with the tape guides are placed in the positions shown in FIG. 6 in which common reference characters with the suffix "*a*" are used to designate components similar to those described hereinbefore. Thus, the tape or leader 21 leaving scanner surface 77 and the outlet end 83 of the tape guide 73 passes between the roller 88a and the fixed edge guide 85 and past the sound head means 31*a* and tape capstan drive means 33*a* to the upper and left quadrant of the take up reel 37*a* for being wound in a clockwise direction about the take up reel hub 117*a*.

With an arrangement of heads, guides, scanner assembly similar to that heretofore described in connection with FIG. 4, the tape take up means may be positioned to conserve space by shortening the distance between centers for the tape cartridge 117*b* and the take up reel 37*b*. A suffix "*b*" has been added to reference characters previously used to identify and describe similar elements in the above specifications. More specifically, a supply tape cartridge 17b may be placed on and removed from a spindle 49 on a turntable at the supply station with its flanges 44 and 45 extending into large arcuate cutouts 133 in take up reel outer flanges 131. The cutouts 133 allow the supply cartridge 17*b* to be inserted or moved from the supply turntable without interference. The take up reel outer flanges 131 may be fixed to and suitably supported by the video tape recorder frame. At the center portion of the take up reel 37*b* are small inner reel flanges 135 which are attached to the take up reel hub 117 *b* for rotation with the hub. The small reel flanges are about ¼ inch larger in diameter than the take up reel hub 117*b* to center and support the initially wound turns of the leader and tape. The smaller reel flanges rotate within a circular opening 137 in the fixed flanges and as the diameter of the tape roll 18*b* becomes larger, the outer turns of video tape will progress outwardly into the space between the fixed outer flanges 133 and then across a gap 139 to the supply cartridge and into space between the flanges 44*b* and 45*b* of supply reel cartridge 17*b*. The distance saved by moving the reel centers toward on another is represented by the shaded area in FIG. 5, which indicates the proportional amount of overlays available when the tape is first all on the supply cartridge and then wound all on the takeup reel.

From the foregoing it was seen that there is provided a convenient and reliable method of obtaining a self threading of a reel of tape about scanner heads and guides, etc., and on to the take up reel. The self-contained cartridge having a leader provides a simple and reliable manner for automatically threading the tape through the video tape recorder prior to initiation of a play record function. The usual standard layout of components such as the scanner heads, guides and take up reel may be retained. The device is particularly effective in obtaining the proper tension in tape and to automatically suspend tape feeding after the tape has been properly threaded.

I claim:

1. In a video tape recorder, an apparatus for automatically threading a tape from a supply cartridge having a roll of video tape which has a leader affixed to the leading end of the tape, said apparatus comprising support means for supporting said supply cartridge, a takeup means spaced from said support means and having means for winding said video tape thereon, a video scanner assembly including a rotatable scanning disk having an outer circular peripheral surface spaced from said support means and mounted for operative association with said video tape transported from said cartridge, sound recording and reproducing transducer means for operative cooperation with said video tape at positions along said path of tape transport intermediate said support means and take-up means; means for initiating movement of said video tape leader forwardly from said cartridge and along the path of tape movement; feed means downstream from said supply cartridge support means having a leader feed nip for feeding said leader forwardly and about said rotatable disk of said video scanner assembly and past said sound recording and reproducing means; first guide means intermediate said supply cartridge and said rotatable circular scanning disk for guiding said leader to adjacent said outer circular peripheral surface of said scanning disk, arcuate guide means extending about a substantial peripheral portion of said circular disk to guide said leader in an arcuate path of substantial length about said circular scanning disk, said first guide means directing said leader in a first direction and said arcuate guide means directing said leader to depart from said first direction through a substantial angular change of direction, means guiding said video tape for an arcuate wrap of substantial length about said rotatable circular scanning disk, exit guide means for guiding said tape leader exiting from said scanning disk past said sound recording and reproducing means to said take-up reel means, video tape drive means for driving said video tape at operational speed and with a predetermined tension in said video tape to establish the tension in said video tape for a subsequent video recording or reproducing operation, and means for disabling said leader feed nip of said feed means as said video tape is being driven by said tape drive means and being wound on said take-up means.

2. A video recorder in accordance with claim 1 in which said feed means includes a push roller which is driven and a guide roller; said push roller and guide roller being disposed on opposite sides of said leader and movable from and to gripping relationship with said video tape.

3. A video recorder in accordance with claim 1 in which said feed means comprises a push roller and a guide roller, said push roller and guide roller being disposed on opposite sides of said leader, in which said cartridge support means includes a turntable and in which a means is engageable with said turntable and said push roller to turn said turntable with driving of said tape.

4. A video recorder in accordance with claim 1 in which said video tape has an oxide surface coating and in which guide means are provided on the exit side of said scanner assembly to wrap said tape with said oxide coating facing inwardly when coiled on said take up means.

5. A video recorder in accordance with claim 1 in which said video tape has an oxide surface coating and in which guide means are provided on the exit side of said scanner assembly to wrap said video tape with said oxide coating facing outwardly when coiled on said take up means.

6. A video tape recorder in accordance with claim 1 in which said means for disabling said feed means includes sensing means for sensing the position of said tape at a predetermined position along said path of travel.

7. A video recorder in accordance with claim 6 in which said sensing means includes a photosensitive system for detecting a change in light characteristics with movement of said tape and leader therepast.

8. A video tape recorder in accordance with claim 6 in which said sensing means senses said leader and said tape and disables said video tape drive means and said take-up means after a predetermined period of time.

9. In a video tape recorder for playing back from or recording on a video tape wound in a coil in a supply cartridge and having a leader secured to the leading end of the video tape, the combination comprising support means for supporting said cartridge as said video tape is unwound from said coil, a take-up means for winding said leader and tape into a coil, leader transporting means downstream from said support means for transporting said leader along a predetermined path from said cartridge to said takeup means, a scanner assembly downstream of said support means and having a rotatable scanning disk with a circular, peripheral surface for contacting said video tape, first guide means intermediate said supply cartridge and said rotatable circular scanning disk for guiding said leader to adjacent said outer circular peripheral surface of said scanning disk, arcuate guide means extending about a substantial peripheral portion of said circular disk to guide said leader in an arcuate path of substantial length about said circular scanning disk, said first guide means directing said leader in a first direction and said arcuate guide means directing said leader to depart from said first direction through a substantial angular change of direction, means for guiding said video tape for an arcuate wrap of at least 180° about said rotatable circular scanning disk, exit guide means for guiding said tape leader exiting from said scanning disk past an audio recording and reproducing means to said take-up reel means, means including audio, audio erase, and track heads located downstream of said video scanner for operative association with said video tape, a capstan tape feeding means for feeding the tape operational speeds, and means for guiding said leader to said take-up means and for attachment thereto so that said leader may be wrapped on said take-up means.

10. A video tape recorder in accordance with claim 9 in which said means for transporting said leader includes a feed means for feeding said leader forwardly past said scanner assembly, said audio head, said audio erase head, and said track heads and further includes a video tape drive means for driving said leader to said take-up means and for driving said video tape at operational speed and with a predetermined tension in the video tape.

11. A video tape recorder in accordance with claim 10 in which means are provided to disable said feed means when said leader reaches said video tape drive means.

12. A video tape recorder in accordance with claim 10 in which said cartridge is separate and separable from a take-up reel for said take-up means, said tape being wound about first and second axes which are spaced from each other by a distance which is less than twice the radius of a fully wound coil of tape in said supply cartridge.

13. A video tape recorder in accordance with claim 12 in which said take up means includes a stationary cover having a portion on a side facing said supply portion cut out to accommodate a portion of said supply cartridge whereby when said tape from said supply cartridge is fully wound in a coil on said take up means a portion of said coil may project into said supply cartridge.

* * * * *